Figure 7:
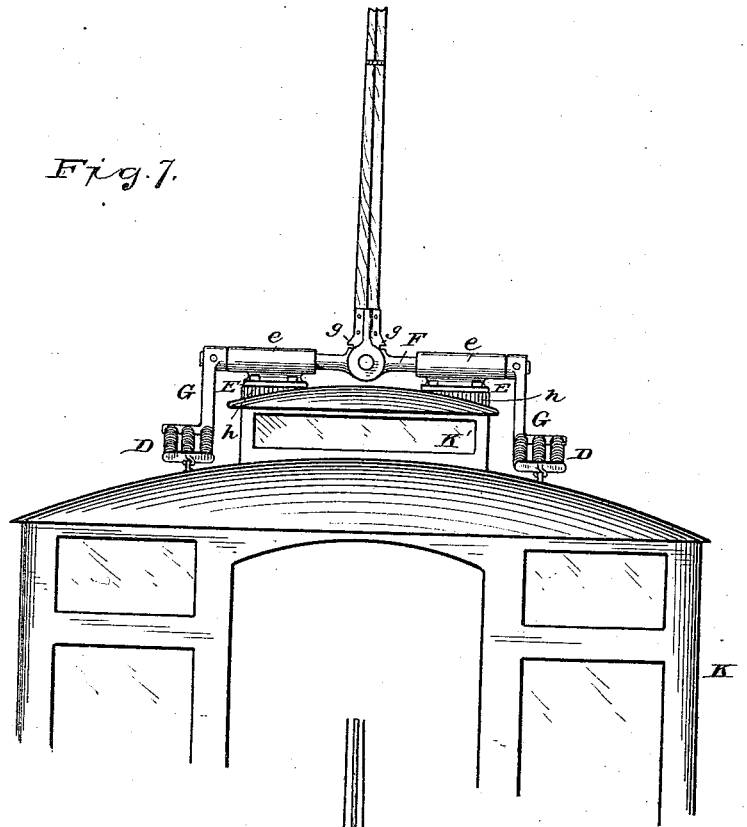

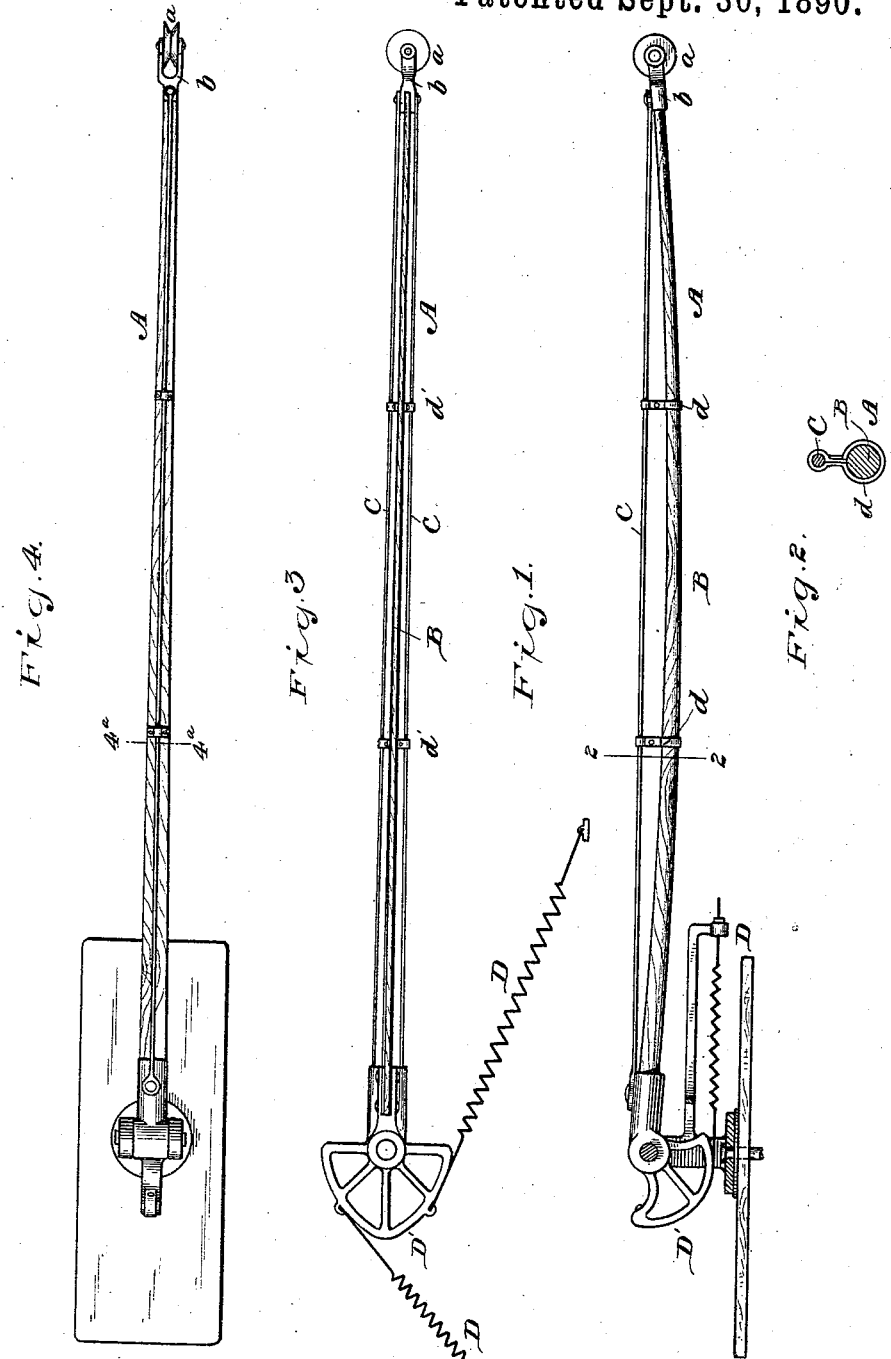

(No Model.)  5 Sheets—Sheet 2.
C. J. VAN DEPOELE.
UPWARD PRESSURE CONTACT DEVICE FOR ELECTRIC RAILWAYS.
No. 437,534.  Patented Sept. 30, 1890.
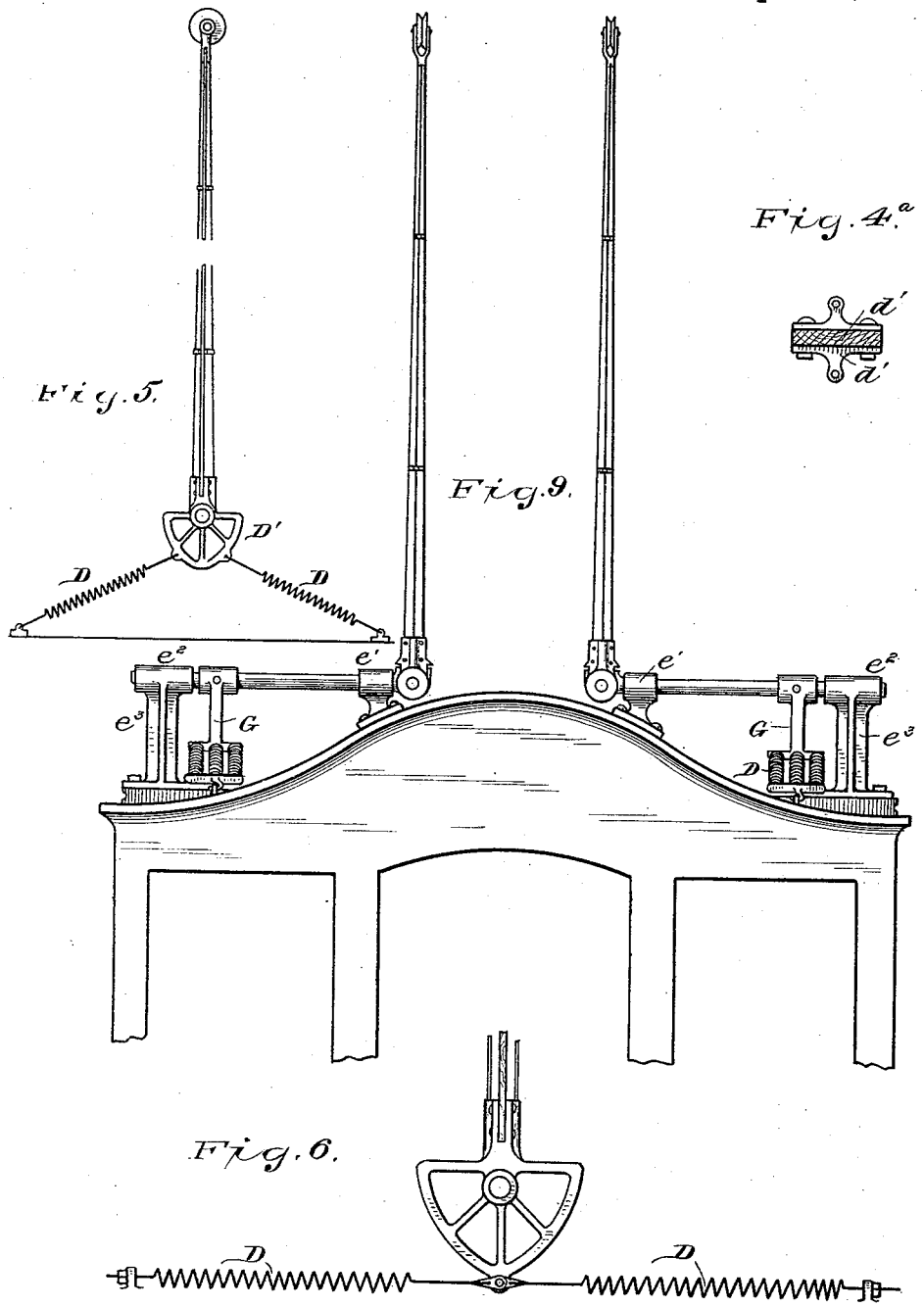
Witnesses
H. A. Lamb
C. L. Sturtevant
Inventor
Charles J. Van Depoele
By his Attorney
Frankland Jannus (No Model.)   5 Sheets—Sheet 3.

C. J. VAN DEPOELE.
UPWARD PRESSURE CONTACT DEVICE FOR ELECTRIC RAILWAYS.

No. 437,534.   Patented Sept. 30, 1890.

Witnesses
H. A. Laub
C. L. Sturtevant

Inventor
Charles J. Van Depoele
By his Attorney
Frankland Jannus

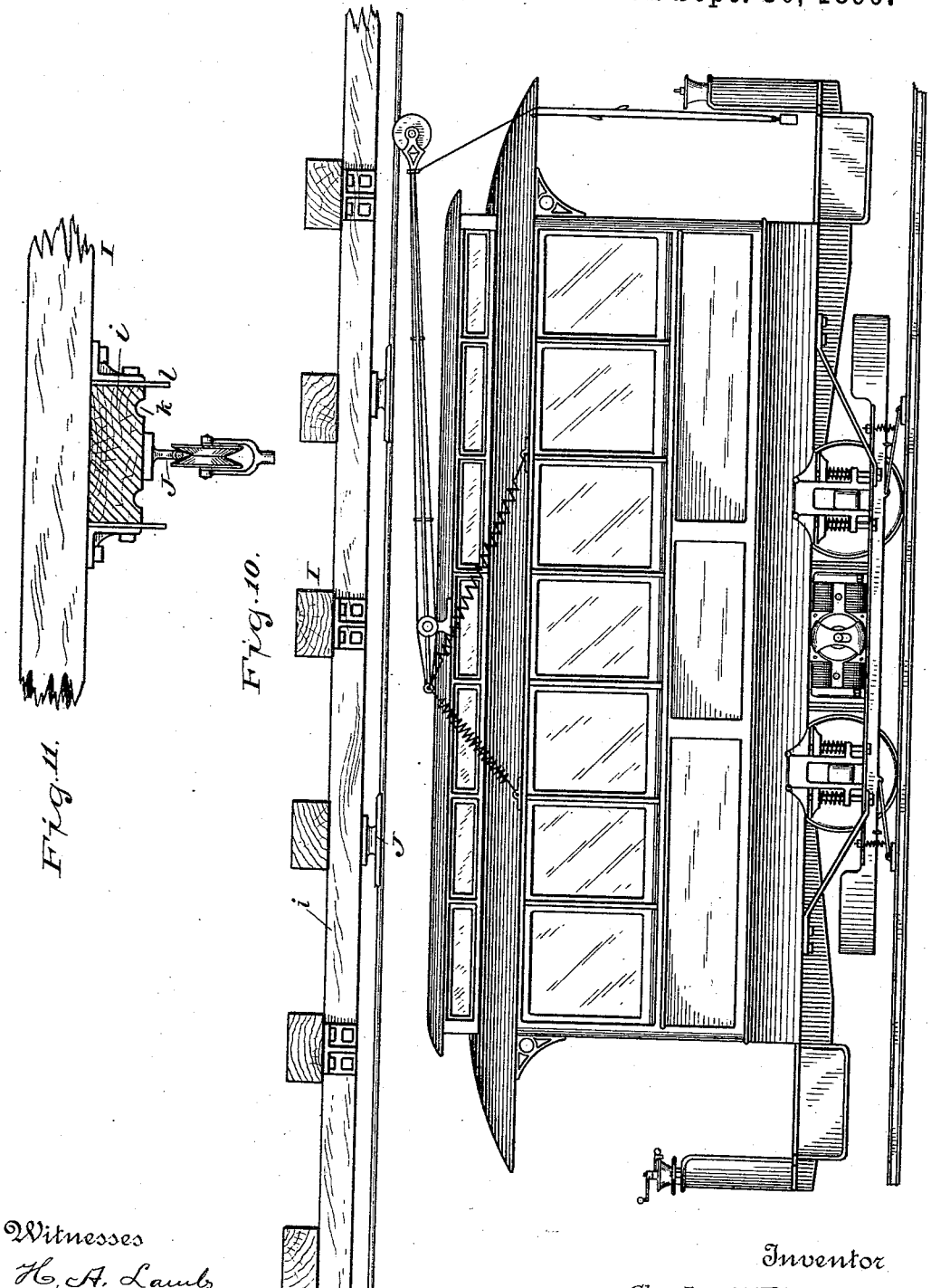

(No Model.)  
5 Sheets—Sheet 5.

C. J. VAN DEPOELE.
UPWARD PRESSURE CONTACT DEVICE FOR ELECTRIC RAILWAYS.

No. 437,534. Patented Sept. 30, 1890.

Witnesses  
H. A. Lamb  
C. L. Sturtevant

Inventor  
Charles J. VanDepoele  
By his Attorney  
Frankland Jannus

UNITED STATES PATENT OFFICE.

CHARLES J. VAN DEPOELE, OF LYNN, MASSACHUSETTS.

UPWARD-PRESSURE CONTACT DEVICE FOR ELECTRIC RAILWAYS.

SPECIFICATION forming part of Letters Patent No. 437,534, dated September 30, 1890.

Application filed April 10, 1890. Serial No. 347,381. (No model.)

*To all whom it may concern:*

Be it known that I, CHARLES J. VAN DE-POELE, a citizen of the United States, residing at Lynn, in the county of Essex and State of Massachusetts, have invented certain new and useful Improvements in Upward-Pressure Contact Devices for Electric Railways, of which the following is a description, reference being had to the accompanying drawings, and to the letters of reference marked thereon.

My invention relates to electric railways of that class in which the electric current is carried from the source along the line of way by a suspended bare conductor or conductors and supplied to the motors upon the vehicles by contact devices carried by the vehicles and engaging and making a traveling contact with the under side of the suspended conductor.

In many instances the electric cars must pass beneath bridges or trestles, and it frequently happens that the space between the top of the car and the conductor is so slight as to necessitate the contact-arm being bent down into a position almost parallel with the top of the car. With many forms of contact-arms heretofore designed, the strain upon the same when bent to this approximately horizontal position has been so great as to give the pole a permanent upward bend, sufficient, in fact, to interfere with its passage under a very low headway. Furthermore, it is often the case that the bridge or trestle beneath which the conductor passes is so low that it is absolutely impracticable to place upon the roof of the car a standard to serve as a support for the contact-arm.

To overcome the difficulties above enumerated and to provide a contact device which will be practical under all circumstances and conditions is the object of my invention.

The present invention therefore comprises an improved trolley-arm so constructed as to be practically rigid and capable of being forced down to its lowest position without bending; also a new and improved means for supporting the arm upon the top of a vehicle and keeping it upwardly pressed against the conductor; and, furthermore, it consists in certain details of construction and arrangement of parts for accomplishing the desired objects in an efficient manner.

Figure 8:
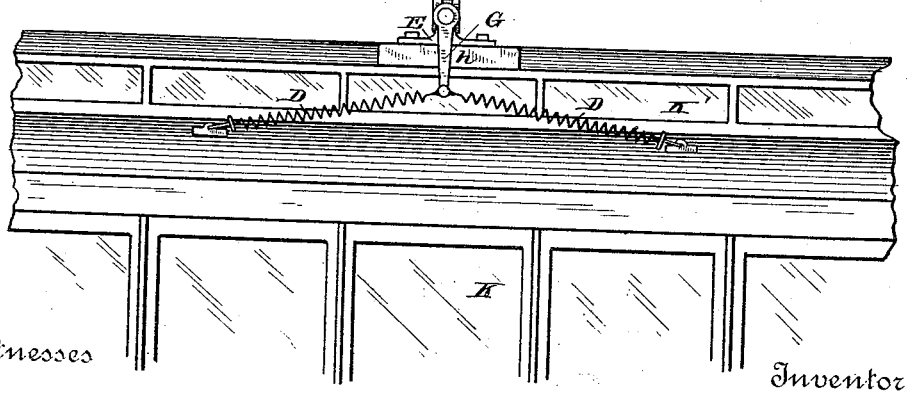
Figure 14:
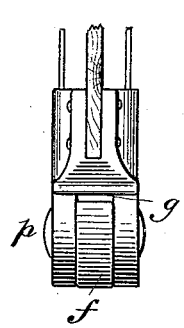
Figure 15:
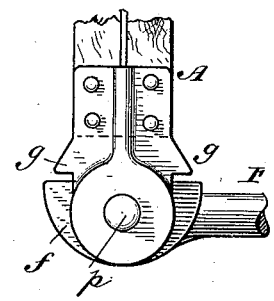
Figure 12:
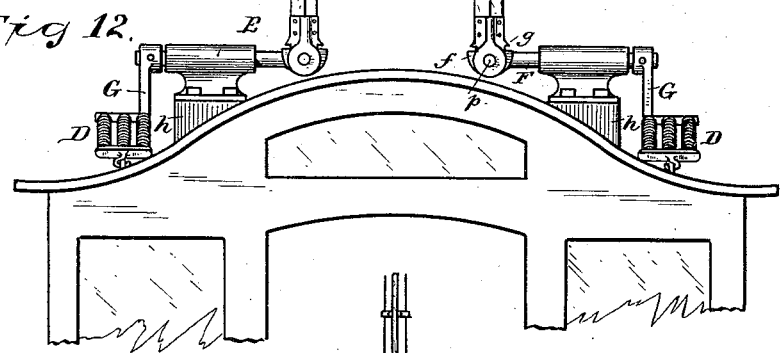
Figure 13:
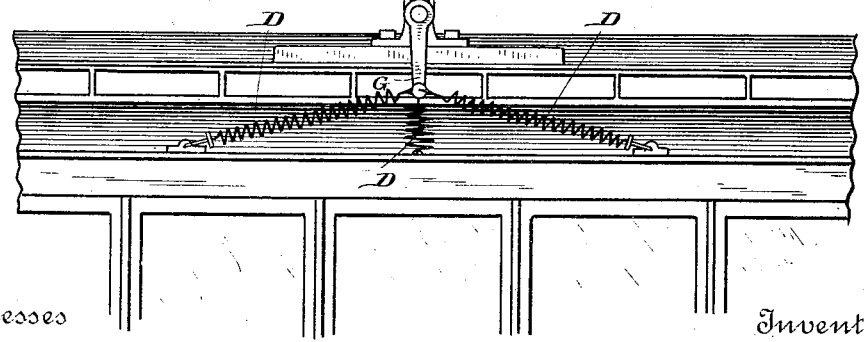

In the accompanying drawings, Figure 1 is a side elevation showing one form of my improved contact-arm. Fig. 2 is a section on line 2 2 of Fig. 1. Figs. 3 and 4 are respectively side and plan views of an arm also embodying the invention, but constructed in a slightly different manner from that shown in Fig. 1. Fig. 4$^a$ is an enlarged sectional detail view of the arm shown in Figs. 3 and 4, taken on the line 4$^a$ 4$^a$. Figs. 5 and 6 show different arrangements of tension-springs for keeping the trolley-wheel normally against the conductors, the arm being shown in a vertical instead of horizontal position, as in Figs. 1, 2, and 3. Fig. 7 is an end view of a car provided with a single trolley-arm supported according to my invention. Fig. 8 is a side view of the same. Fig. 9 shows my invention as applied to a double-overhead-conductor railway system. Fig. 10 is a side view of a car and part of a bridge or trestle, showing the car in the act of passing under the same. Fig. 11 is an end view of an arrangement attached to the under side of the bridge for supporting the conductor. Fig. 12 is a view similar to Fig. 9, but with a slightly different arrangement of parts. Fig. 13 is a side view of the device shown in Fig. 12. Figs. 14 and 15 are details showing the manner of pivoting the lower end of the contact-arm to allow it a slight lateral movement.

Referring now to Figs. 1 to 6, A represents my improved contact-arm or trolley-pole, which is provided with a grooved contact device $a$ at its outer end. Fig. 1 shows the construction of the arm designed for use from one side only, as where the cars run upon a continuous track; but it may be reversed, when desired, by turning it upon its vertical axis. The arm consists of a rod B of suitable material, preferably wood, bent into bow shape and fitting at one end into a socket pivoted to a standard pivotally mounted upon the top of the car, said socket being arranged and supported in a manner substantially the same as shown in Letters Patent granted to me on the 25th day of March, 1890, No. 424,381. At the opposite end the bow B is secured to a metal piece $b$, to which the contact wheel or device is secured. Secured at either end to said socket and piece $b$ is a rod C, desirably of steel, which is connected at suitable intervals with the bow-shaped rod B by braces or struts d d forming a truss. By the arrangement described it will be obvious that the tendency of the bow B to straighten will be resisted by the tensile strength of the rod C, thus at all times preserving a straight upper edge and making the arm to pass under any structure higher than its supporting-standard.

In many instances it is preferred to employ an arm which instead of being movable upon a vertical pivot is sustained upon a transverse axis, and is reversed by being moved to opposite position thereon, thus putting the strain of service on either side, as desired. Such an arm must be equally strong in both directions, and for this use I employ the form shown in Figs. 3, 4, 5, and 6, and seen also in certain other of the figures. In this form a central wooden blade or strip B forms the thrust member, this material being employed as combining lightness with strength and therefore well suited to the present purpose.

Two steel rods C C are secured parallel with the upper and lower faces of the strip B, being connected thereto and to one another by suitable braces $d'$ $d'$, (shown in Fig. $4^a$,) whereby, no matter in which direction the trolley-arm may be inclined, the tendency of the strip B to bend when forced to a horizontal position will be counteracted by the tensile strength of one of the rods C.

Tension-springs are applied to the lower portion of the arm, and, as shown or indicated in Figs. 3, 5, 6, 7, 8, 9, 10, 12, and 13, the same arrangement of the duplex form of spring set forth in my patent, No. 408,638, August 6, 1889, is employed, as distinguished from the single-acting form seen in Fig. 1.

The double springs D D are connected to the lower part of the arm and extend in opposite directions therefrom, and their outer ends are secured to the car-roof or to some insulated sustaining device mounted upon the top of the vehicle for that purpose.

As indicated in Figs. 3 and 10, when the contact-arm is depressed to a considerable extent the two sets of springs coact, both helping to return it toward a vertical position.

As seen in Figs. 3, 5, and 6, the tension-springs D D are connected to an extension or cam D', formed upon or secured to the base of the trolley-arm, substantially as set forth in my said patent, No. 408,638; but this construction necessitates a supporting-standard, which must be upon that part of the top of the vehicle upon which the arm is located, and this, for obvious reasons, must be in the center of the roof of the vehicle, which is usually its highest point. In many instances this added height is not objectionable; but under some circumstances it is desirable to so arrange the contact devices that they may be depressed to the lowest possible point—in fact, to a point very little, if any, above the normal height of the car-roof. A feature of the present invention therefore consists in an arrangement whereby the trolley-arm-supporting devices do not extend more than a few inches above the highest part of the car-roof, or as low as it would be safe to pass a car under an obstruction under any circumstances.

Referring now to Figs. 7 and 8, my improved means for supporting and pivoting the trolley-arm is shown, the same being peculiarly adapted for conditions in which it is impracticable to secure the same to a vertical standard upon the top of the car. In these figures the central portion K' of the roof of the car K thereof is raised, as is customary. Mounted upon this central portion of the roof are low insulated supports E E, provided with journal-bearings e e, in which is mounted a horizontal rock-shaft F. This shaft is provided with a flattened central portion $f$, (shown in detail in Figs. 14 and 15,) and is fitted between the bifurcated lower ends of the trolley-arm, a pivot-pin $p$, passing through said parts, allowing to the free end of the trolley-arm a limited lateral movement. Projections $g$ $g$ upon the lower end of the trolley-bar, above the pivot-point, serve to limit this lateral movement to whatever range may be necessary to prevent strain or the derailment of the contact device.

It will be obvious that any of the various forms of trolley-bars now in use could be applied in this connection, the present part of the invention not being limited to the particular construction of trolley shown and described; nor do I desire to be limited to the particular manner in which the trolley-arm is secured to the rock-shaft, as the same could be accomplished in a variety of ways.

The rock-shaft F is provided, as shown, at each end with a crank G, to the lower part of which two oppositely-arranged sets of tension-springs D D are connected, their outer extremities being attached to the vehicle. One or more springs may be arranged to form a set, batteries of three being shown in several instances. The action of the springs D D when connected to the rock-shaft is substantially the same as when connected to the extension D' at the foot of the trolley-pole, their effect being to normally hold the pole in a vertical position and to impart an upward tendency thereto from either direction.

Figs. 12 and 13 show a form similar to that seen in Figs. 7 and 8, except that the rock-shaft F is divided into two portions, each separately supported at one side of the center of the car-roof, and each carrying a trolley-pole at its inner extremity, said poles being articulated thereto, as explained. It may be desired in some instances to add to the effect of the oppositely-acting tension-springs just described, and I have therefore shown in Fig. 13 a third spring $D^2$, which is connected to the crank G and secured to the support equidistant between the laterally-extending springs D D. This third spring is not essential, and may be used under some circumstances, if desired.

The rock-shaft may of course be sustained in a variety of ways—for example, as seen in Fig. 9, where instead of a single long bearing $e$ the shaft is provided with two bearings $e'$ $e^2$, arranged near its extremities, the inner bearing $e'$ being for convenience secured as near as possible to the center of the car-roof, and the outer bearing sustained upon a standard $e^3$, secured near the edge of the car-roof. With this arrangement the crank G and tension-springs D D may be disposed in any convenient position between the bearings. Furthermore, all metallic parts employed to sustain the contact-carrying arm or arms should be properly insulated from the roof of the vehicle in any known or desired manner.

Fig. 10 shows in side elevation a car provided with my improved trolley arm and support and in the act of passing beneath a bridge the height of which is only slightly greater than that of the car. In such relation it is desirable to support the conductors so firmly that they will have no vibratory movement, and, further, particular care is necessary to properly insulate the same. To accomplish these objects is the purpose of another feature of my invention.

To the lower beams I of the bridge is permanently attached an insulating-board $i$, to which are secured in any suitable manner the ears or bails J, forming the ordinary conductor-support.

To prevent water flowing from the superstructure over the board $i$ and thence to the bails or ears and from them to the conductor and thereby establishing electrical connection with the bridge, the board $i$ is provided with longitudinal grooves $k$, which prevent any water climbing up to the conductor-supports. In order to still further guard against the above, the board $i$ may be covered with painted canvas, so that in case it should split no water could reach the conductor, and, further, said board may be provided with depending sides or flanges $l$, which, besides preventing water from reaching the under surfaces of the board $i$, will prevent the trolley from leaving the trough in case it should become detached from the conductor.

It must be understood that the present invention is not limited to the precise details of construction and arrangement herein shown and described, since the latter may be modified in a variety of ways without departing from the spirit and scope of the invention.

Having described my invention, what I claim, and desire to secure by Letters Patent, is—

1. A contact-arm for electric railways, consisting of a wooden trolley-pole forming a strut and a metal tie-rod therefor, the tie-rod being connected at its extremities with the extremities of the wooden pole, and one or more intermediate braces connecting the tie with the strut, substantially as described.

2. A contact-arm for electric railways, comprising a strut member, a tie rod or rods therefor, and braces connecting the tie rod or rods and strut, substantially as described.

3. A contact-arm for electric railways, comprising a downwardly-curved trolley-pole forming a strut, a tie-rod connected to the ends of the pole and arranged along its upper side, and one or more braces connecting the tie with the strut, substantially as described.

4. A contact-arm for electric railways, comprising a central strut member and parallel tie-rods on either side thereof, substantially as described.

5. A contact-arm for electric railways, comprising a central strut member and parallel tie-rods on either side thereof, and braces connecting the tie-rods with the strut member on either side, substantially as described.

6. In combination with a suspended supply-conductor and a vehicle to be propelled, a rock-shaft transversely mounted in bearings upon the same, a contact-arm secured at one end to said shaft, so as to have a limited lateral movement with respect thereto, and means connected with the shaft for keeping the arm in a normally-vertical position, substantially as described.

7. In combination with a suspended supply-conductor and a vehicle to be propelled, a rock-shaft transversely mounted in bearings upon the same, a contact-arm secured at one end to said shaft, so as to have limited lateral movement with respect thereto, and oppositely-acting springs connected with the shaft for keeping the arm in a normally-vertical position.

8. In combination with a suspended supply conductor and a vehicle to be propelled, a transverse shaft mounted in insulated bearings upon the same, and a contact-arm pivotally secured at one end to said shaft, an arm or arms G, attached to said shaft, and oppositely-acting springs secured to said arm or arms and to the vehicle for imparting a vertical tendency to the contact-arm.

9. An upward-pressure contact device for electric railways, comprising a rock-shaft mounted transversely upon the vehicle, a contact-carrying arm jointed upon said rock-shaft, so that its free end may be capable of limited lateral movement, a crank upon said rock-shaft independent of the arm, and a spring applied to said crank for imparting an upward tendency to the free end of the arm.

10. In combination with a suspended supply-conductor and a vehicle to be propelled, a transverse shaft mounted in insulated bearings upon the vehicle to be propelled, and a contact-arm pivotally secured at one end to said shaft, so as to have lateral movement, an arm or arms G, attached to said shaft, and oppositely-acting springs secured to said arm or arms and to the vehicle for keeping the contact-arm in a normally-vertical position.

11. In combination with a suspended supply-conductor and a vehicle, a transverse shaft mounted in insulated bearings upon the same, said shaft being provided with a flattened portion, a contact-arm having a bifurcated lower end fitting over said flattened portion of the shaft, a pivot-pin passing through the same, stops upon said contact-arm for limiting its lateral movement, an arm or arms G, attached to said shaft, and oppositely-acting springs secured to said arm or arms and to the vehicle.

12. In combination with a suspended supply-conductor and a vehicle to be propelled, a transverse shaft mounted in insulated bearings thereupon, said contact-arm being pivotally secured at one end to said shaft, an arm or arms G, attached to said shaft, oppositely-acting inclined springs D D, attached to said arm G at one end and to the vehicle at the other, and a positively-acting vertical spring $D^2$.

13. The improved contact-arm herein described, comprising a socket pivotally secured upon the vehicle and to which the tension devices may be attached, a flexible bar or rod secured at one end in said socket, a metallic extension attached to the other end of said rod or bar and carrying the contact device, and a tie rod or rods secured at either end to said socket and said extension, respectively.

14. In electric railways, the combination, with a superstructure below which the car passes, of a continuous strip of insulating material secured underneath the structure, conductor-supporting devices secured to and insulated by the said continuous strip, said strip being provided also with water-deflecting grooves.

15. In electric railways, the combination, with a superstructure below which the car passes, of a continuous strip of insulating material secured underneath the structure, conductor-supporting devices secured to and insulated by the said continuous strip, and depending flanges at the edges of the insulator, substantially as described.

In testimony whereof I affix my signature in presence of two witnesses.

CHARLES J. VAN DEPOELE.

Witnesses:
FRANKLAND JANNUS,
STEPHEN JANNUS.